United States Patent
Tsuruta et al.

(10) Patent No.: US 8,487,740 B2
(45) Date of Patent: *Jul. 16, 2013

(54) VEHICLE FUNCTION RESTRICTION SYSTEM

(75) Inventors: Hiroshi Tsuruta, Aichi (JP); Kenji Suzuki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 988 days.

This patent is subject to a terminal disclaimer.

(21) Appl. No.: 12/480,205

(22) Filed: Jun. 8, 2009

(65) Prior Publication Data

US 2009/0309696 A1 Dec. 17, 2009

(30) Foreign Application Priority Data

Jun. 12, 2008 (JP) ................................. 2008-154392

(51) Int. Cl.
*H04L 9/14* (2006.01)

(52) U.S. Cl.
USPC ......... 340/5.22; 340/5.2; 340/5.21; 340/5.25; 340/5.31; 340/5.7; 340/426.1; 340/426.35; 70/263; 70/278.2; 70/278.7; 70/337; 70/338; 235/375; 235/382; 235/382.5

(58) Field of Classification Search
USPC ............. 340/5.2, 5.21, 5.22, 5.31, 5.67, 5.72, 340/5.8, 5.24, 5, 25, 5.7, 425.5, 426.1, 426.35; 70/91, 237, 258, 263, 278.1, 278.2, 278.3, 70/278.7, 283.1, 288, 337–343, 388–391; 701/2, 701/1, 102, 103; 235/375–385; 180/270
See application file for complete search history.

(56) References Cited

U.S. PATENT DOCUMENTS

| | | | | |
|---|---|---|---|---|
| 3,688,861 A | * | 9/1972 | Lipschultz et al. | 180/287 |
| 3,708,032 A | * | 1/1973 | Suzuki | 180/287 |
| 3,782,493 A | * | 1/1974 | Lipschutz et al. | 180/287 |
| 3,851,505 A | * | 12/1974 | Wilkinson | 70/255 |
| 4,119,171 A | * | 10/1978 | Remontet | 180/287 |
| 4,641,509 A | * | 2/1987 | Batchelor et al. | 70/388 |
| 4,827,744 A | * | 5/1989 | Namazue et al. | 70/252 |
| 4,898,010 A | * | 2/1990 | Futami et al. | 70/278.1 |
| 4,993,627 A | * | 2/1991 | Phelan et al. | 340/5.67 |
| 5,422,632 A | * | 6/1995 | Bucholtz et al. | 340/5.24 |
| 5,656,867 A | * | 8/1997 | Kokubu | 307/10.5 |
| 5,685,183 A | * | 11/1997 | Hattori et al. | 70/252 |
| 5,959,540 A | * | 9/1999 | Walter | 340/5.64 |
| 5,973,411 A | | 10/1999 | Tado et al. | |

(Continued)

FOREIGN PATENT DOCUMENTS

| | | |
|---|---|---|
| JP | 09-221002 | 8/1997 |
| JP | 2004-25936 | 1/2004 |
| JP | 2006-063627 | 3/2006 |

*Primary Examiner* — George Bugg
*Assistant Examiner* — Sisay Yacob
(74) *Attorney, Agent, or Firm* — Patterson Thuente Pedersen, P.A.

(57) ABSTRACT

A vehicle function restriction system for installation in a vehicle. The vehicle includes a master key allowed to activate any function of the vehicle. The system includes a valet key mounted in the vehicle and configured to dismountable from the vehicle to be lent to a person to whom the vehicle is lent. A restriction setting unit sets the vehicle in a restriction state when the valet key is dismounted from the vehicle. The restriction setting unit sets at least one restricted vehicle functions which is not activated by the valet key, in accordance with the person to whom the vehicle is lent.

15 Claims, 10 Drawing Sheets

U.S. PATENT DOCUMENTS

| | | | |
|---|---|---|---|
| 5,982,295 A * | 11/1999 | Goto et al. | 340/10.52 |
| 6,389,859 B1 * | 5/2002 | Paolini et al. | 70/340 |
| 6,546,768 B1 * | 4/2003 | Burghoff et al. | 70/252 |
| 6,810,700 B2 * | 11/2004 | Okuno | 70/186 |
| 7,034,658 B2 * | 4/2006 | Hayashi et al. | 340/5.72 |
| 7,302,817 B2 * | 12/2007 | Ohtaki et al. | 70/186 |
| 7,392,675 B2 * | 7/2008 | Kito | 70/252 |
| 7,545,255 B2 * | 6/2009 | Ohtaki et al. | 340/5.72 |
| 7,730,752 B2 * | 6/2010 | Yoshitake et al. | 70/252 |
| 7,930,915 B2 * | 4/2011 | Katagiri | 70/252 |
| 8,011,214 B2 * | 9/2011 | Katagiri et al. | 70/252 |
| 8,028,552 B2 * | 10/2011 | Ko et al. | 70/252 |
| 8,069,694 B2 * | 12/2011 | Nakamoto | 70/186 |
| 8,089,339 B2 * | 1/2012 | Mikan et al. | 340/5.2 |
| 8,138,887 B2 * | 3/2012 | Hirano | 340/5.73 |
| 2001/0033221 A1 * | 10/2001 | Thomas et al. | 340/5.61 |
| 2003/0015006 A1 * | 1/2003 | Tamukai | 70/186 |
| 2003/0213845 A1 * | 11/2003 | Hermann et al. | 235/385 |
| 2004/0075530 A1 * | 4/2004 | Ghabra et al. | 340/5.6 |
| 2005/0159856 A1 * | 7/2005 | Daghan et al. | 701/1 |
| 2006/0139146 A1 * | 6/2006 | Ito et al. | 340/5.31 |
| 2007/0090921 A1 * | 4/2007 | Fisher | 340/5.73 |
| 2008/0024270 A1 * | 1/2008 | Katagiri | 340/5.72 |
| 2008/0100418 A1 * | 5/2008 | Stobbe et al. | 340/5.73 |
| 2008/0150683 A1 * | 6/2008 | Mikan et al. | 340/5.31 |
| 2009/0064740 A1 * | 3/2009 | Katagiri et al. | 70/237 |
| 2009/0064741 A1 * | 3/2009 | Katagiri | 70/237 |
| 2009/0091421 A1 * | 4/2009 | Hirano | 340/5.7 |
| 2009/0309696 A1 * | 12/2009 | Tsuruta et al. | 340/5.22 |
| 2010/0071427 A1 * | 3/2010 | Tsuruta | 70/237 |

* cited by examiner

| Restrictable Item | | Level | | | |
|---|---|---|---|---|---|
| | | Lv.1 | Lv.2 | Lv.3 | Lv.4 |
| / | Glove Box SW Operation | × | × | × | × |
| ① | Travel Distance | | | | × |
| ② | Speed | | | | × |
| ③ | Car Navigation Operation | | | × | × |
| ④ | Trunk SW Operation | | | × | × |
| ⑤ | Fuel Filler Cap SW Operation | | | | × |
| ⑥ | Console Box SW Operation | | | × | × |
| ⑦ | Seat Position Memory SW Operation | | × | × | × |
| ⑧ | Rear Air Conditioner SW Operation | | | × | × |
| ⑨ | Vehicle TEL Operation | | | × | × |
| ⑩ | ETC Operation | | | × | × |
| ⑪ | G-BOOK Operation | | | × | × |

|  |  | Changeable Level | | | |
|---|---|---|---|---|---|
|  |  | Lv.1 | Lv.2 | Lv.3 | Lv.4 |
| Restriction Level When Valet Key Was Lent | Lv.1 | | ○ | ○ | ○ |
| | Lv.2 | × | | ○ | ○ |
| | Lv.3 | × | × | | × |
| | Lv.4 | × | × | × | |

(ex.) Lv.1 —Change→ Lv.4 —Return to Original Level→ Lv.1
Lv.2 ——→ Lv.3 ——→ Lv.2
Lv.1 ——→ Lv.2 ——→ Lv.1
　　　　　　　　　　×→ Lv.3

VEHICLE FUNCTION RESTRICTION SYSTEM

CROSS-REFERENCE TO RELATED APPLICATIONS

This application is based upon and claims the benefit of priority from prior Japanese Patent Application No. 2008-154392, filed on Jun. 12, 2008, the entire contents of which are incorporated herein by reference.

BACKGROUND OF THE INVENTION

The present invention relates to a vehicle function restriction system for restricting usable vehicle functions when lending a vehicle to someone.

To use a valet parking service, the user of a vehicle gives the vehicle key to a valet. However, some users may worry that the valet will tamper with the vehicle. Accordingly, a vehicle function restriction system that restricts usable vehicle functions when the vehicle is lent to another person has been proposed (e.g., Japanese Laid-Open Patent Publication No. 2004-25936).

In the system of the '936 publication, the vehicle functions are all usable when a master key is used. However, when a valet key is used, the engine can be started only once. When the user of a vehicle implementing such a system uses a valet parking service, the user gives the valet key to the valet. In this case, the valet can only park the vehicle.

SUMMARY OF THE INVENTION

In the '936 publication, the vehicle has only one function restriction state. Thus, the restriction state cannot be varied in accordance with who the vehicle is being lent to.

It is an object of the present invention to provide a highly versatile vehicle function restriction system.

One aspect of the present invention is a vehicle function restriction system. The vehicle function restriction system includes a valet key mounted in the vehicle and configured to be dismountable from the vehicle and lent to a person to whom the vehicle is lent. A restriction setting unit sets the vehicle in a restriction state when the valet key is dismounted from the vehicle. The restriction setting unit sets at least one restricted vehicle functions which is not activated by the valet key, in accordance with the person to whom the vehicle is lent.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In this specification, a restriction state refers to a state in which among the various functions of a vehicle, activation restrictions are imposed on at least one of the vehicle functions so that usable functions free from such restriction can be activated.

A preferred embodiment of a vehicle function restriction system according to the present invention will now be discussed.

Figure 1:
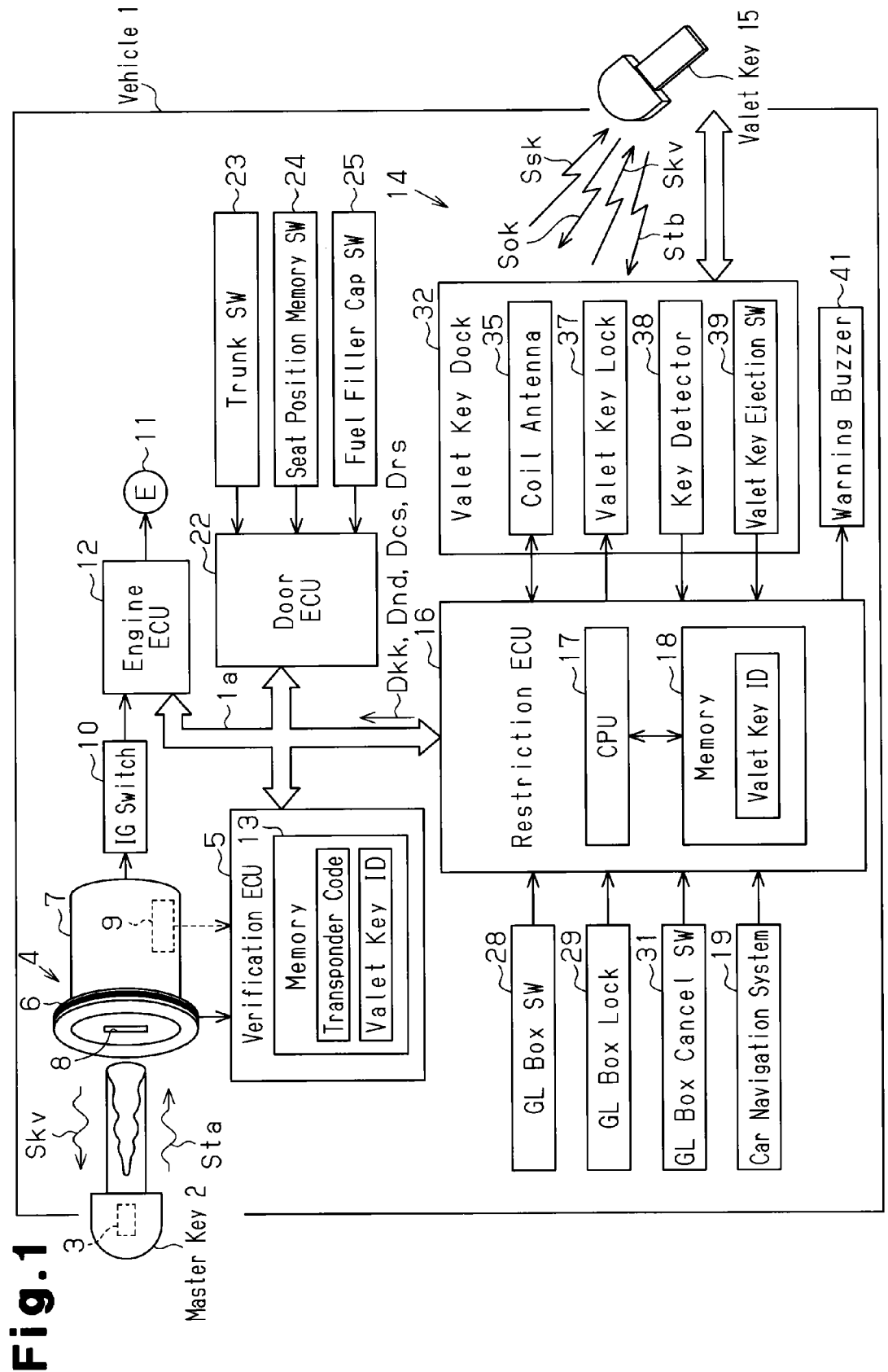
FIG. 1 is a block diagram of a vehicle function restriction system according to a preferred embodiment of the present invention.

Referring to FIG. 1, a vehicle 1 implements an immobilizer system 4, which is one type of an electronic key system. The immobilizer system 4 is used with a master key (mechanical key) 2 having an electronic key function. The immobilizer system 4 outputs a transponder activating drive radio wave Skv. When receiving the drive radio wave Skv, a transponder 3 incorporated in the master key 2 is activated by the drive radio wave Skv to transmit a transponder code registered in the transponder 3 to the vehicle 1. The immobilizer system 4 verifies the received transponder code with a code registered in the vehicle 1 and allows the vehicle to be operated when the verification is established.

The immobilizer system 4 includes an immobilizer antenna 6, which is a coil antenna wound around a key hole of a key cylinder 7. The immobilizer antenna 6 is used to perform wireless communication with the transponder 3 in compliance with the Radio Frequency Identification (RFID) communication protocol. The immobilizer antenna 6 is one example of a vehicle antenna.

The immobilizer antenna 6 is connected to a verification ECU 5, which is arranged in the vehicle 1. The verification ECU 5 is a control unit for controlling the immobilizer system 4.

The verification ECU 5 is connected to a key detection switch 9, which detects the insertion of the master key 2 into the key cylinder 7. The key cylinder 7 is connected to an ignition switch 10, which includes various types of relays (ACC relay, IG relay, starter relay, etc.). The verification ECU 5 is connected to an engine ECU 12 by an in-vehicle LAN 1a. The engine ECU 12 performs ignition control and fuel injection control for an engine 11. The engine ECU 12 enables the engine 11 to be started if ID verification is established by the immobilizer system 4 when the master key 2 is turned to an engine start position in the key cylinder 7.

The verification ECU 5 starts to output the drive radio wave Skv from the immobilizer antenna 6 when receiving a switch signal from the key detection switch 9 indicating insertion of the master key 2 into the key cylinder 7. When the transponder 3 in the master key 2 receives the drive radio wave Skv, the transponder 3 is powered and activated by the drive radio wave Skv to transmit a transponder signal Sta, which includes the transponder code registered in the transponder 3, towards the vehicle 1. When receiving the transponder signal Sta, the verification ECU 5 executes immobilizer verification to verify the transponder code of the master key 2 with a transponder code registered in a memory 13 of the verification ECU 5. Immobilizer verification is established when the codes correspond to each other. The verification ECU 5 deactivates the immobilizer lock when immobilizer verification is established and keeps the immobilizer activated when immobilizer verification is not established.

When the master key 2 is turned to the engine start position in the key cylinder 7, the engine ECU 12 sends an inquiry to the verification ECU 5 to check whether immobilizer verification has been verified. If the engine ECU 12 obtains a affirmative response, that is, a response indicating that immobilizer verification has been established from the verification ECU 5, the engine ECU 12 starts ignition control and fuel injection control to start the engine 11. When the engine ECU 12 obtains a negative response, that is, a response indicating that immobilizer verification has not been established from the verification ECU 5, the engine ECU 12 does not execute ignition control and fuel injection control and keeps the engine 11 stopped.

A valet key system 14 is installed in the vehicle 1. The valet key system 14 sets a restriction state (also referred to as restriction level) of the vehicle 1 using a valet key (a sub key) 15, which differs from the master key 2 when lending the vehicle 1 to another person. The valet key 15 is mounted in the vehicle 1. The valet key 15 is dismounted from the vehicle 1 when lending the valet key 15 to another person. The valet key system 14 sets or registers a restriction level (hereinafter referred to as valet key restriction level) for the valet key 15 whenever the valet key 15 is dismounted from the vehicle 1 and lent to another person. This sets restricted vehicle functions and restricts the usable functions of the vehicle 1 when the valet key 15 is used. The valet key 15 may have an electronic key function. The master key 2 serves as a first vehicle key. The valet key 15 serves as a second vehicle key. Further, the valet key system 14 is an example of a vehicle function restriction system.

The structure of the valet key system 14 will now be discussed.

A control unit for the valet key system 14 or a restriction ECU 16 is installed in the vehicle 1. The restriction ECU 16 is connected by the in-vehicle LAN 1a to other in-vehicle ECUs, such as the ECUs 5, 12, and 22. The restriction ECU 16 includes various types of devices such as a CPU and a memory 18 (ROM, RAM). In one example, the restriction ECU 16 is a dedicated printed circuit substrate.

In one example, the restriction ECU 16 functions as a restriction setting unit, a valid period setting unit, a verification unit, a restriction state varying unit, and a check unit by executing program codes. In another example, the restriction setting unit, the valid period setting unit, the verification unit, the restriction state varying unit, and the check unit may be hardware. In a further example, parts of the restriction setting unit, the valid period setting unit, the verification unit, the restriction state varying unit, and the check unit may be realized by the restriction ECU 16, and other parts of these units may be realized by hardware differing from that of the restriction ECU 16.

Figure 5:
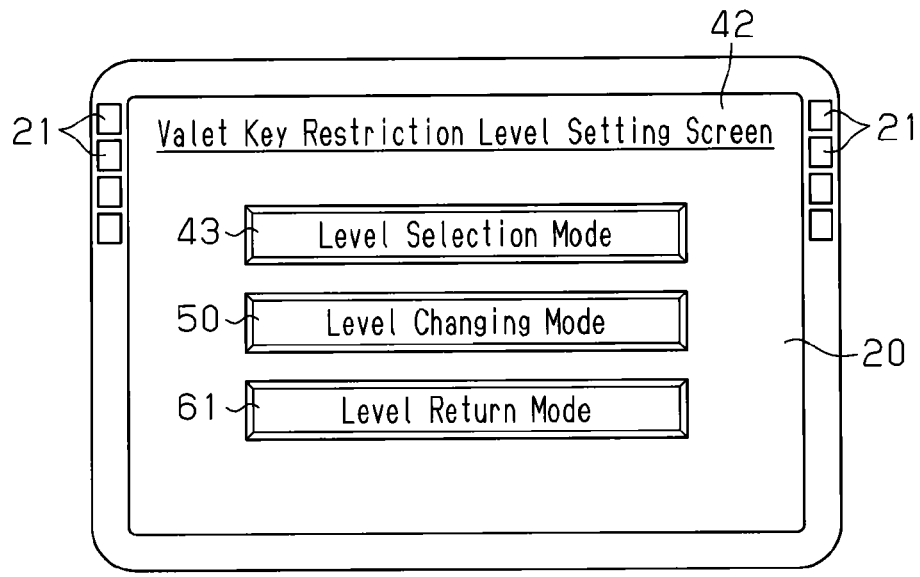
FIG. 5 is a screen shot of a valet key restriction level setting screen.

The restriction ECU 16 is connected to a car navigation system 19. Referring to FIG. 5, the car navigation system 19 includes a display 20, which is of a touch panel operation type, and an input device 21. The display 20 shows the current location of the vehicle and the route to a destination. The display 20 and the input device 21, which are commonly shared by the valet key system 14 and the car navigation system 19, and are also used by the valet key system 14.

As shown in FIG. 1, the verification ECU 5 is connected to a door ECU 22, which manages the locking and unlocking of the doors of the vehicle 1 via the in-vehicle LAN 1a. When the master key 2 is a wireless remote control key, the master key 2 transmits a lock request signal through wireless communication when a lock button of the master key 2 is operated. When the vehicle 1 receives the lock request signal, the door ECU 22 locks all of the doors. When an unlock button of the master key 2 is operated, the master key 2 transmits an unlock request signal through wireless communication. When the vehicle 1 receives the unlock request signal, the door ECU 22 unlocks all of the doors.

The vehicle 1 includes a trunk switch 23, which is operated to open the trunk, a rear gate, or hatch. A seat position memory switch 24 is operated to register the position of the driver seat in the vehicle 1. A fuel filler cap switch 25 is operated to open the fuel filler opening. The door ECU 22 monitors the operation states of the switches 23, 24, and 25 and manages the operations of the switches 23, 24, and 25. Specifically, the door ECU 22 validates or invalidates the operations of the switches 23, 24, and 25 in accordance with the commands corresponding to the restriction state of the vehicle 1 provided from the restriction ECU 16.

Figure 2:
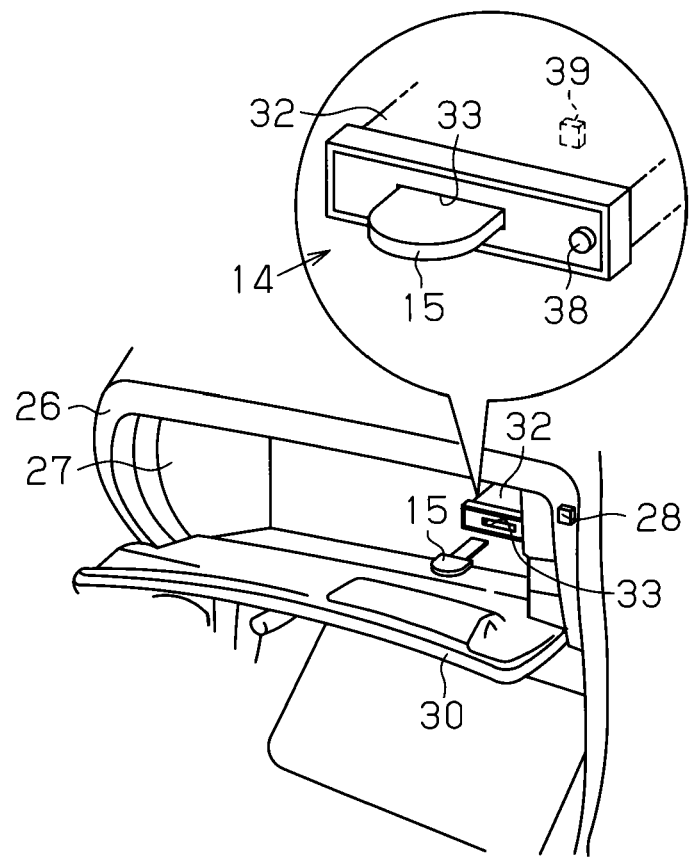
FIG. 2 is a perspective view showing a valet key dock in a glove box.

As shown in FIG. 2, an accommodation compartment such as a glove box 27 is arranged in a dashboard 26 of the vehicle 1. The glove box 27 has a door 30 that opens when a glove box switch 28 is operated. The glove box switch 28 is a momentary switch of a push-operation type and electrically connected to the restriction ECU 16. A glove box lock 29 (see FIG. 1) locks the door 30 of the glove box 27 when closed. The glove box lock 29 is of a mechanical control interlock type including a latch and a striker. With a mechanical control interlock type lock, when closing the door 30 of the glove box 27, the striker pushes and moves the latch, which is biased by a biasing member such as a coil spring, against the biasing force. When the door 30 reaches a fully closed position, the biasing member moves the latch in a direction opposite the direction it was moving so as to lock the striker. When the glove box switch 28 is pushed in a state in which the glove box 27 is closed, the restriction ECU 16 opens the glove box lock 29. A biasing member (not shown) such as a torsion spring opens the door 30 of the glove box 27.

Referring to FIG. 1, the vehicle 1 includes a glove box cancel switch 31 operated to prohibit opening of the glove box 27. The glove box cancel switch 31 is an alternate switch of a push-operation type arranged near the driver seat and electrically connected to the restriction ECU 16. When the glove box cancel switch 31 is activated, the restriction ECU 16 prohibits the opening of the glove box 27 and keeps the glove box 27 closed regardless of the operation of the glove box switch 28.

As shown in FIG. 2, a valet key dock 32 is arranged in the glove box 27. The valet key dock 32 receives the valet key 15. A slot 33 is formed in the front surface of the key dock 32. The valet key 15 is inserted into the slot 33. In the illustrated example, part of the valet key 15 is exposed from the slot 33. When an authorized user uses the vehicle 1 in a state of no restrictions, the valet key 15 is inserted in the valet key dock 32. When the authorized user lends the vehicle 1 to another person, the valet key 15 is dismounted from the valet key dock 32 and lent to the other person.

Figure 3:
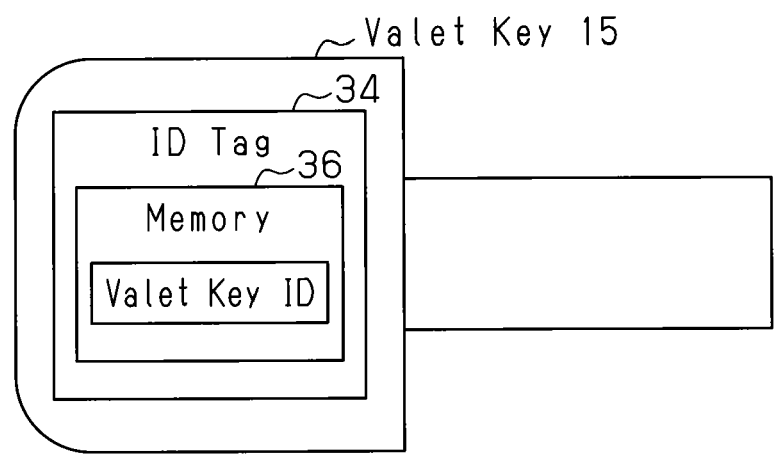
FIG. 3 is a schematic view of the valet key.

Referring to FIG. 3, the valet key 15 is a mechanical key having an electronic key function and is similar to the master key 2. The valet key 15 includes a memory 36 for storing a received valet key ID. The valet key 15 has an ID tag 34, which is similar to the transponder 3 of the master key 2. The ID tag 34 performs wireless communication with the vehicle 1 (valet key dock 32) in compliance with the RFID communication protocol. An ID code string (valet key ID) of the valet key 15 is registered in the ID tag 34. When verification of the valet key ID is established, the vehicle 1 becomes operable in a state in which the usable functions are restricted by the valet key ID.

As shown in FIG. 1, a coil antenna 35 is arranged in the key dock 32. The coil antenna 35 functions as a vehicle antenna for the valet key system 14. The coil antenna 35 is formed by an antenna wire wound around the slot 33. The coil antenna 35 is electrically connected to the restriction ECU 16. Bidirectional wireless communication, which is in compliance with the RFID communication protocol, is carried out between the ID tag 34 and the coil antenna 35.

The coil antenna 35 transmits an ID registration signal Ssk including the valet key ID. When receiving the ID registration signal Ssk, the ID tag 34 registers the valet key ID of the ID registration signal Ssk in the memory 36. As a result, the valet key 15 becomes usable as a vehicle key. The ID registration signal Ssk includes the valet key ID and a drive radio wave, which activates the deactivated ID tag 34. When the registration of the valet key ID in the memory 36 is completed in a normal manner, the ID tag 34 transmits a registration completion notification Sok and notifies the vehicle 1 that ID registration has been completed.

As shown in FIG. 1, the valet key dock 32 includes a valet key lock 37, which prevents the valet key 15 from being freely dismounted from the valet key dock 32. The valet key lock 37 is of a mechanical control interlock type and similar to the glove box lock 29. The valet key dock 32 includes a valet key detector 38, which detects the insertion of the valet key 15. The valet key detector 38 is connected to the restriction ECU 16 and detects, for example, partial insertion (or complete insertion) of the valet key 15.

The valet key dock 32 includes an ejection switch 39, which is operated to dismount the valet key 15. The ejection switch 39 is a momentary switch of a push-operation type and is electrically connected to the restriction ECU 16. The restriction ECU 16 displays a valet key restriction level selection screen 40 (see FIG. 6) on the display 20 when operation of the ejection switch 39 is detected so that the user can select or input the valet key restriction level. The restriction ECU 16 generates the valet key ID in correspondence with the selected or input valet key restriction level. Then, the restriction ECU 16 registers the valet key ID to the valet key 15 via the valet key dock 32. When the confirming that registration of the valet key ID has been completed, the restriction ECU 16 opens the valet key lock 37 and allows for dismounting the valet key 15, which is now usable as a vehicle key. A biasing member such as a coil spring may be arranged in the valet key dock 32 so that the valet key 15 is popped out of the valet key dock 32 by a predetermined amount when the valet key lock 37 opens.

The operation of the valet key system 14 will now be discussed.

The control executed by the valet key system 14 when lending the vehicle 1, of which usable functions have been restricted, to another person will now be discussed.

Figure 4:
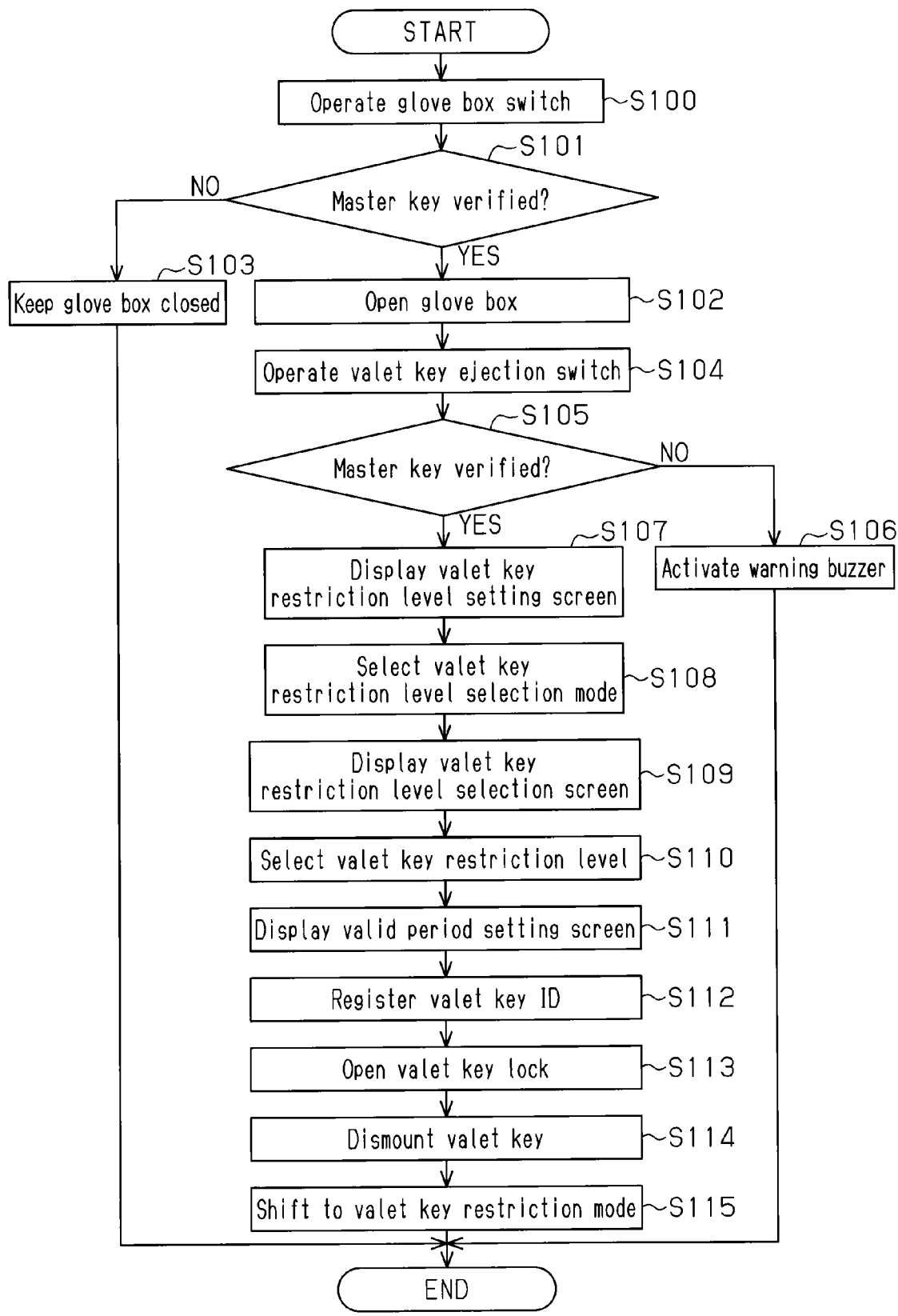
FIG. 4 is a flowchart showing a restriction initiation process performed when the valet key is lent to a another person.

The user enters the vehicle 1 with the master key 2 and first inserts the master key 2 into the key cylinder 7. The verification ECU 5 performs immobilizer verification on the master key 2 and holds the verification result. The control performed thereafter is shown in FIG. 4.

The user pushes the glove box switch 28 to dismount the valet key 15 from the glove box 27 (S100).

When detecting the pushing of the glove box switch 28, the restriction ECU 16 sends an inquiry to the verification ECU 5 to check whether or not immobilizer verification has been established (S101). When obtaining an affirmative response, that is, a response indicating that immobilizer verification has been established from the verification ECU 5, the restriction ECU 16 operates the glove box lock 29 to open the glove box 27 (S102). When obtaining the negative response from the verification ECU 5, the restriction ECU 16 does not operate the glove box lock 29 and keeps the glove box 27 closed (S103). Therefore, the glove box 27 remains closed even if another person, who does not have the master key 2, tries to open the glove box 27.

After the glove box 27 opens, the user operates the ejection switch 39 (S104). When detecting the operation of the ejection switch 39, the restriction ECU 16 starts the valet key restriction level setting control so that the user can set the valet key restriction level. In this case, the restriction ECU 16 sends an inquiry to the verification ECU 5 to check whether or not immobilizer verification has been established (S105). The inquiry is sent to the verification ECU 5 to check the result of immobilizer verification in S105 since the glove box 27 may have been opened to remove articles other than the valet key 15. When obtaining a negative response from the verification ECU 5, the restriction ECU 16 activates an in-vehicle warning buzzer 41 (see FIG. 1) to issue a warning deterring wrongful removal of the valet key 15 by another person (S106).

When the ejection switch 39 is pushed and an affirmative response is obtained from the verification ECU 5, the restriction ECU 16 displays a valet key restriction level setting screen 42, which is shown in FIG. 5, on the display 20 (S107). Button images shown in the valet key restriction level setting screen 42 includes a level selection mode button 43. The user touches the level selection mode button 43 to select or set the valet key restriction level. This selects the valet key restriction level selection mode (S108).

Figure 6:
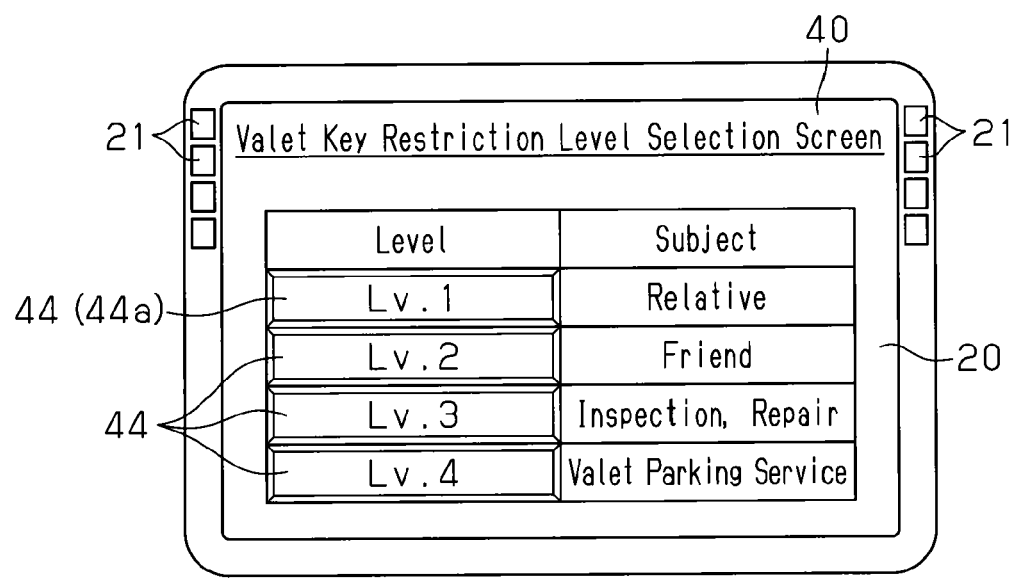
FIG. 6 is a screen shot of a valet key restriction level selection screen.

In the valet key restriction level selection mode, the restriction ECU 16 displays the valet key restriction level selection screen 40 shown in FIG. 6 on the display 20 (S109). A plurality of level selection buttons 44 is displayed on the valet key restriction level selection screen 40. The user touches the level selection button 44 that corresponds to the desired valet key restriction level.

Figures 7, 8:
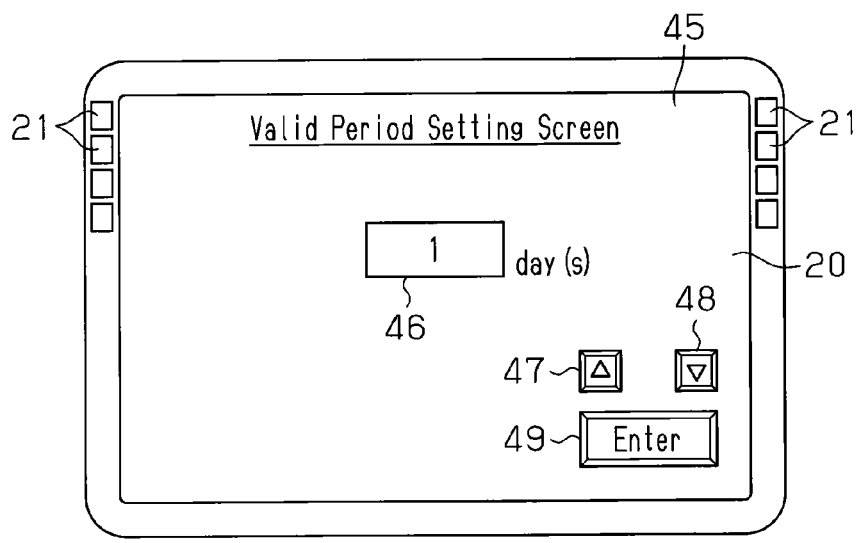
FIG. 7 is a table of vehicle functions and valet key restriction levels.
FIG. 8 is a screen shot of a valid period setting screen.

In the example shown in FIG. 7, as the numerical value of the valet key restriction level becomes higher, more vehicle functions are restricted and less vehicle functions are usable, that is, usable functions are less. In valet key restriction level 1, only the opening of the glove box 27 is prohibited. Other vehicle functions are enabled. This level is selected when lending the vehicle 1 to, for example, a relative such as a family member. In valet key restriction level 2, the opening of the glove box 27 and a driver seat position memory operation are prohibited. Other vehicle functions are enabled. This level is selected when lending the vehicle 1 to, for example, a friend. In valet key restriction level 3, systems related with the traveling of the vehicle are usable and the opening of a fuel filler opening is permitted. Other vehicle functions are disabled. This level is selected when the vehicle 1 is lent to a mechanic for repairs. In valet key restriction level 4, the traveling distance and the traveling speed are limited to predetermined values. This level is selected when leaving the vehicle 1 to a valet for valet parking service.

The user selects the valet key restriction level by selecting the level selection button 44 in accordance with the person to whom the vehicle 1 is lent (S110). For instance, the user touches the first level selection button 44a of the valet key restriction level selection screen 40 to select valet key restriction level 1 when lending the vehicle 1 to a relative.

After completing selection of the valet key restriction level, the restriction ECU 16 displays a valid period setting screen 45 shown in FIG. 8 on the display 20 (S111). The valid period setting screen 45 includes a valid period input field 46, a numerical value increase button 47, a numerical value decrease button 48, and an enter button 49. The user touches the numerical value increase button 47 and the numerical value decrease button 48 to input the valid period of the valet key restriction mode in the valid period input field 46. After completing the input of the valid period, the user touches the enter button 49 to end the input operation for the valet key restriction level. The valid period may be indicated by number of days or time or by an expiration date or expiration time. A state in which the valet key system 14 is in the valet key restriction mode is synonymous to a state in which the functions of the vehicle are restricted. Termination of the valet key restriction mode of the valet key system 14 is synonymous to cancellation of a state in which the functions of the vehicle are restricted.

The restriction ECU 16 then generates the ID registration signal Ssk, which includes the valet key ID and the drive radio wave, transmits the ID registration signal Ssk from the coil antenna 35, and performs ID registration for the valet key 15 in the key dock 32 (S112).

Although the restriction ECU 16 generates the valet key ID in correspondence with the selected or input valet key restriction level, the valet key ID is changed whenever the valet key system 14 enters the valet key restriction mode even if the valet key restriction level is the same. The valet key ID is a rolling code that changes whenever the valet key restriction level is set. When receiving the ID registration signal Ssk, the ID tag 34 of the valet key 15 is activated by the drive radio wave of the ID registration signal Ssk to register the valet key ID in the ID registration signal Ssk as a key code in the memory 36. If a previously registered valet key ID is remaining in the memory 36 of the valet key 15, such valet key ID is replaced (overwritten) by the new valet key ID. The valet key 15 transmits the registration completion notification Sok when confirming that the registration of the valet key ID has been completed in a normal manner.

When the registration completion notification Sok transmitted from the valet key 15 is received by the coil antenna 35, the restriction ECU 16 determines that the registration of the valet key ID has been normally completed. Then, the restriction ECU 16 provides the verification ECU 5 with valet key information Dkk, which includes the valet key ID registered in the valet key 15 and the valid period of the valet key ID. The verification ECU 5 associates the valet key ID with the valid period, and registers them in the memory 13. In this manner, the current valet key ID (code string) registered in the valet key 15 and the valid period of the valet key ID are registered in the vehicle 1 (in particular, memory 13 of verification ECU 5).

When confirming completion of the registration of the valet key ID in the valet key 15 and the verification ECU 5, the restriction ECU 16 opens the valet key lock 37 (S113). This pops the valet key 15 out of the valet key dock 32 by a predetermined amount. The user dismounts the valet key 15 from the valet key dock 32 (S114). The restriction ECU 16 determines dismounting of the valet key 15 based on the detection signal from the ejection switch 39. When the valet key 15 is dismounted, the restriction ECU 16 shifts the operation mode of the valet key system 14 to the valet key restriction mode (S115). Thus, when using the valet key 15, the usable functions of the vehicle are restricted in accordance with the presently registered valet key restriction level.

The user removes the master key 2 from the key cylinder 7 after dismounting the valet key 15 from the valet key dock 32. The user then gives the valet key 15 to the person who the user is going to lend the vehicle 1. The user keeps the master key 2.

When driving the vehicle 1 with the valet key 15 borrowed from the user, the person borrowing the vehicle 1 inserts the valet key 15 into the key cylinder 7 and turns the key cylinder 7. When the key detection switch 9 detects key insertion into the key cylinder 7, the verification ECU 5 transmits the drive radio wave Skv from the immobilizer antenna 6 and performs immobilizer verification. The immobilizer verification is performed by verifying the valet key ID returned from the valet key 15 with the valet key ID registered in the memory 13 in response to the drive radio wave Skv. The immobilizer verification may be performed by checking whether the received key code (transponder code, valet key ID) is registered in the memory 13. When confirming that the received valet key ID matches or corresponds with that registered in the memory 13, the verification ECU 5 checks the valid period registered in the memory 13. If the received valet key ID is within the valid period, it is determined that ID verification (also referred to as valet key verification) has been established. Thus, the verification ECU 5 permits the use of the vehicle 1 with the restricted vehicle functions, that is, within the range of the usable functions. In one example, the key code is used to specify the restricted vehicle functions. In another example, the key code is used to specify the usable functions.

The restriction ECU 16 measures the elapsed time from when the valet key system 14 entered the valet key restriction mode (S115) with a timer (not shown). The restriction ECU 16 monitors whether or not the valet key ID registered in the valet key 15 is usable based on the measured elapsed period and the valid period set in the valid period setting screen 45. If the measured elapsed period exceeds the valid period, under the assumption that the valet key ID is invalid, the restriction ECU 16 does not permit vehicle operations performed with the valet key 15 even when receiving the valet key ID from the valet key 15.

The control is executed by the valet key system 14 when the valet key 15, which was lent to another person, is returned to the valet key dock 32.

Figure 9:
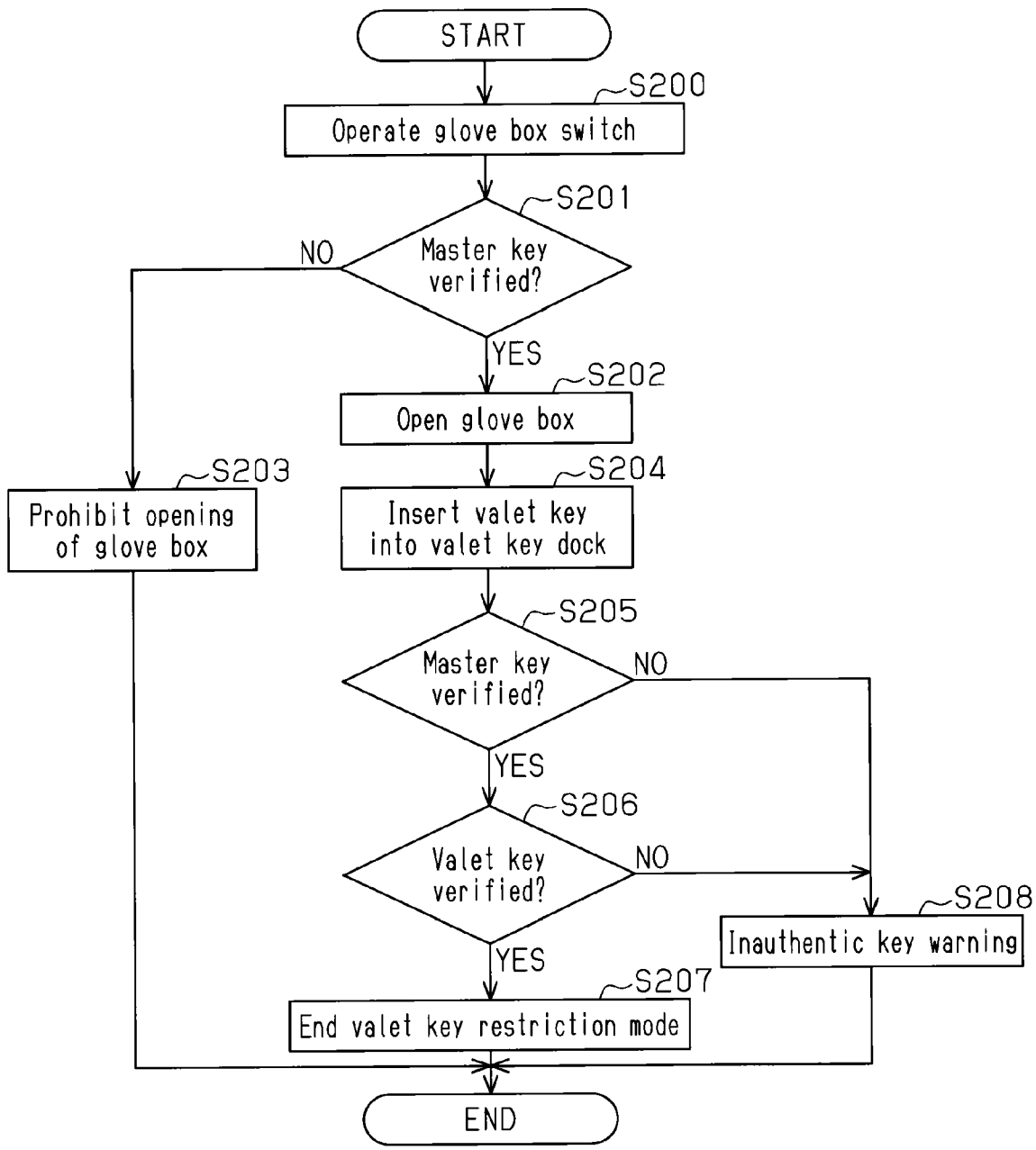
FIG. 9 is a flowchart showing a restriction cancellation process performed when the valet key is returned.

The user, who is carrying the master key 2, enters the vehicle 1 and inserts the master key 2 into the key cylinder 7. The verification ECU 5 performs immobilizer verification with the master key 2 and holds the verification result. The control thereafter is shown in FIG. 9.

The user operates the glove box switch 28 to insert the valet key 15 into the valet key dock 32 in the glove box 27 (S200). When detecting the operation of the glove box switch 28, the restriction ECU 16 sends an inquiry to the verification ECU 5 to check whether or not immobilizer verification has been established (S201). The restriction ECU 16 operates the glove box lock 29 to open the glove box 27 when obtaining an affirmative response from the verification ECU 5 (S202). The restriction ECU 16 does not operate the glove box lock 29 and keeps the glove box 27 closed when obtaining a negative response from the verification ECU 5 (S203). Therefore, the glove box 27 is kept closed even if another person, who does not have the master key 2, tries to open the glove box 27.

After the glove box 27 opens, the user inserts the valet key 15 that has been returned from the other person, into the valet key dock 32 (S204). When the valet key detector 38 detects insertion of the valet key 15 into the valet key dock 32, the restriction ECU 16 transmits the drive radio wave Skv from the coil antenna 35 of the valet key dock 32. When receiving the drive radio wave Skv, the ID tag 34 is powered and activated by the drive radio wave Skv to generate a key ID signal Stb, which includes the valet key ID (key code) stored in the memory 36, and transmits the key ID signal Stb to the vehicle 1. The restriction ECU 16 performs key verification (immobilizer verification) on the valet key ID of the received key ID signal Stb and holds the verification result. The restriction ECU 16 performs the key verification on the valet key 15 at this timing to check whether or not a key other than the valet key 15 such as a dummy key has been inserted into the valet key dock 32.

The restriction ECU 16 sends an inquiry again to the verification ECU 5 to check whether or not immobilizer verification has been established (S205). When the valet key 15 is inserted into the valet key dock 32, the restriction ECU 16 sends an inquiry again and checks whether immobilizer verification of the master key has been established because of the possibility of the glove box 27 being opened to retrieve articles other than the valet key 15 and not because the valet key 15 is inserted into the valet key dock 32. In one example, the restriction ECU 16 sends and inquiry to the verification ECU 5 to check the verification result obtained in step S201. In another example, the verification ECU 5 performs immobilizer verification on the master key 2 again in step S205. Then, the restriction ECU 16 sends an inquiry to the verification ECU 5 to check the verification result.

The restriction ECU 16 checks whether or not the key verification of the valet key 15 has been established when obtaining an affirmative response from the verification ECU 5 in S205 (S206). The restriction ECU 16 ends the valet key restriction mode that is being executed when confirming that key verification of the valet key 15 has been established in S206 (S207). In this case, the restriction ECU 16 outputs a mode termination notification Dnd and notifies the verification ECU 5 of the termination of the valet key restriction mode. The mode termination notification Dnd is a command for deleting the valet key ID written in the memory 13 of the verification ECU 5. In response to the mode termination notification Dnd from the restriction ECU 16, the verification ECU 5 deletes the valet key ID registered in the memory 13. This prohibits subsequent vehicle operations with the valet key 15.

The restriction ECU 16 determines that the key presently inserted into the key cylinder 7 is an inauthentic key when obtaining a negative response from the verification ECU 5 in S205. The restriction ECU 16 determines that the valet key presently inserted into the valet key dock 32 is an inauthentic key when acquiring a negative response in S206. If negative results are obtained in step S205 or S206, the restriction ECU 16 activates the in-vehicle warning buzzer 41 to issue warning indicating that an inauthentic key has been returned (S208).

The valet key restriction level may be changed during the period in which the valet key system 14 is in the valet key restriction mode, that is, when the valet key 15 is lent to another person. The valet key restriction level changing mode will now be discussed.

Figure 13:
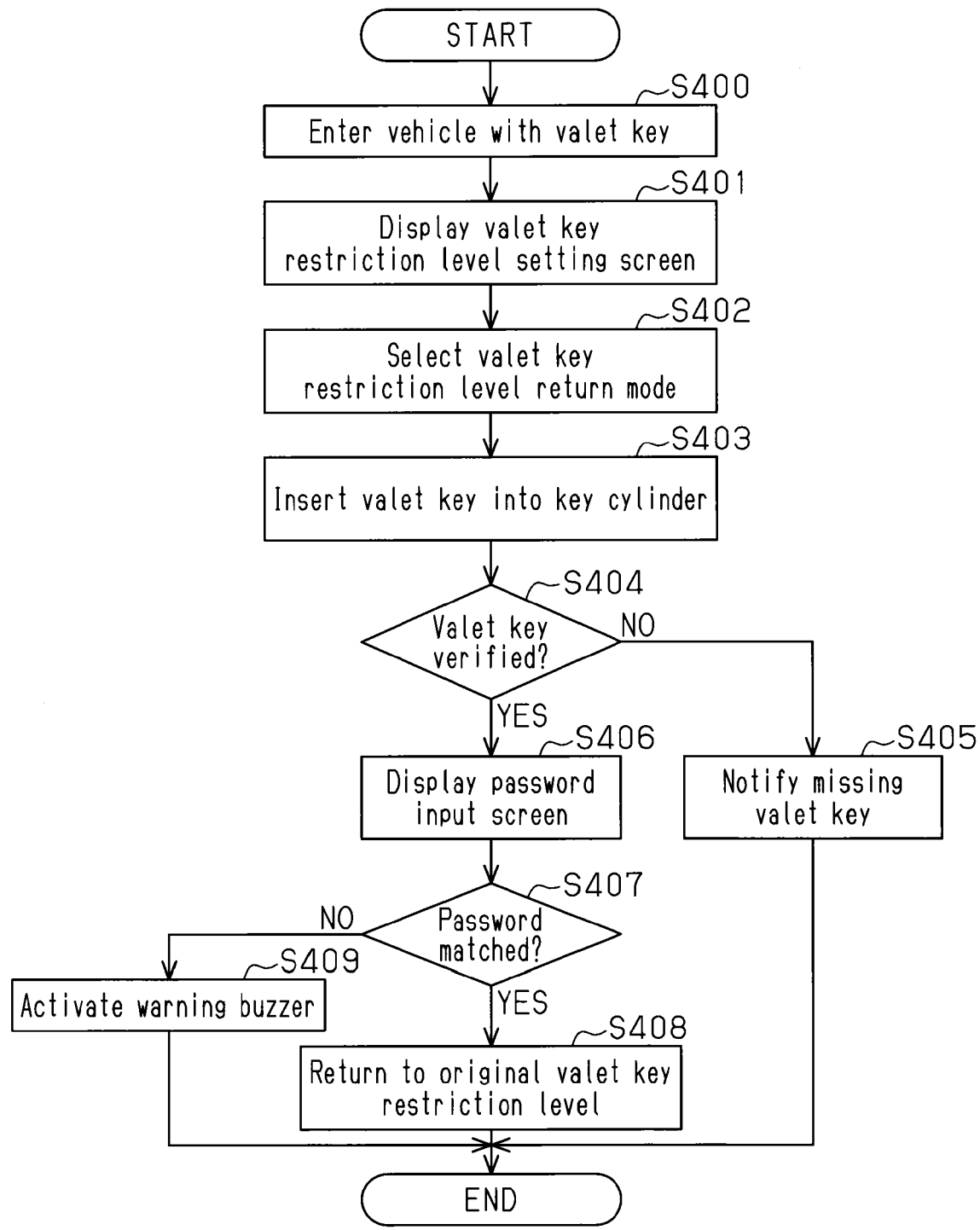
FIG. 13 is a flowchart showing a restriction level returning process.

The valet key restriction level changing mode includes a restriction level increase mode (FIG. 10), which is for changing the present valet key restriction level to a higher restriction level, and a level return mode (FIG. 13), which is for returning the valet key restriction level to an original level, that is, the restriction level just before the restriction level was increased.

Figure 10:
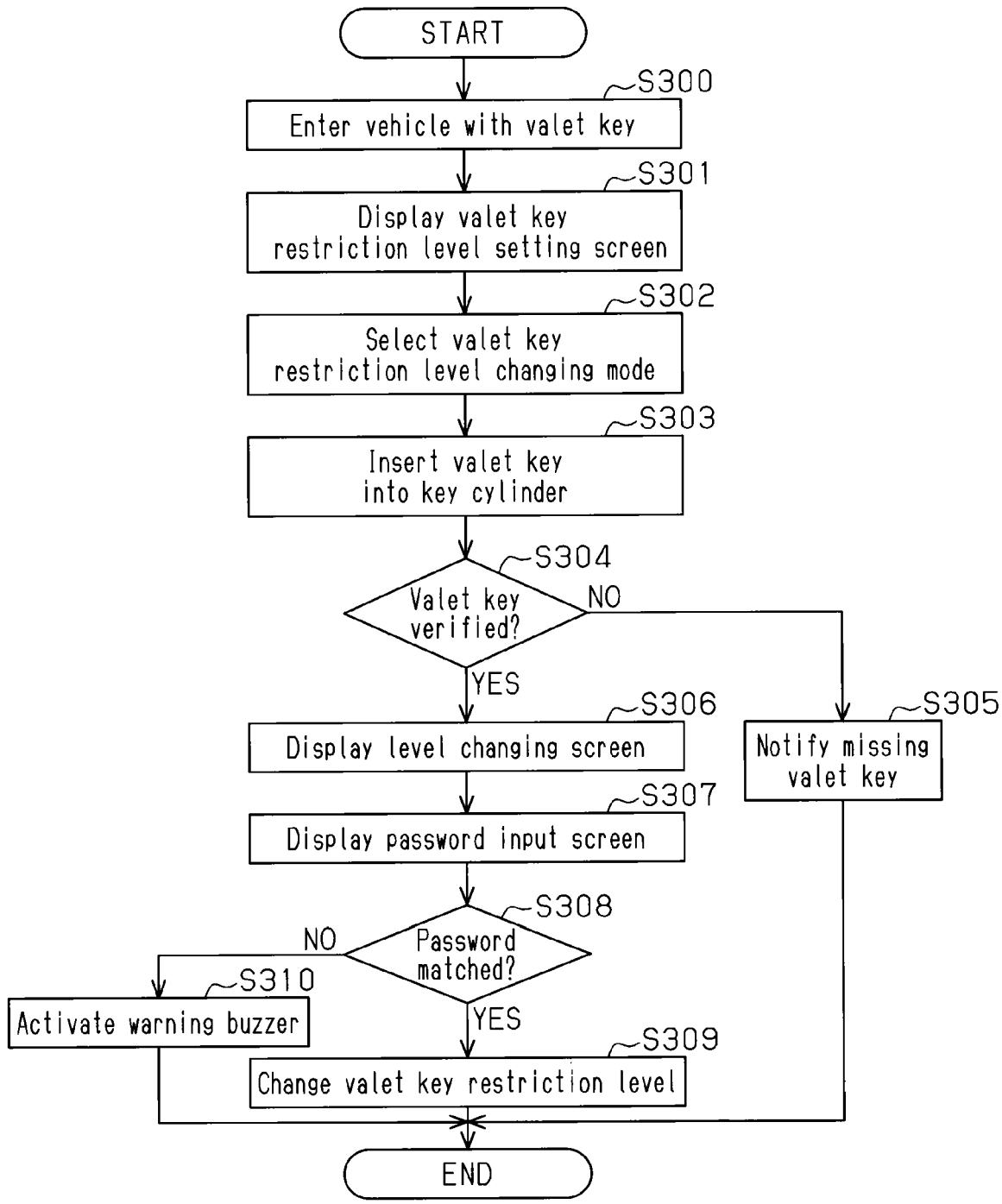
FIG. 10 is a flowchart showing a restriction level varying process performed after the valet key is lent to another person.

The restriction level increase mode is selected when the user or the person borrowing the vehicle 1 wishes to change the valet key restriction level. As shown in FIG. 10, the user (or the person borrowing the vehicle 1) who wishes to change the valet key restriction level carries the valet key 15 when entering the vehicle 1 (S300). The user touches the display 20 to show the valet key restriction level setting screen 42 (FIG. 5) on the display 20 (S301). The user touches a level changing mode button 50 in the valet key restriction level setting screen 42 to select the valet key restriction level changing mode (S302).

The restriction ECU 16 then requests the user to insert the valet key 15 into the key cylinder 7 (S303). A message urging the user to insert the valet key 15 into the key cylinder 7 is displayed on the display 20. When the key detection switch 9 detects insertion of the valet key 15 into the key cylinder 7, the verification ECU 5 transmits the drive radio wave Skv from the immobilizer antenna 6 and executes immobilizer verification on the valet key 15 (in particular, the ID tag 34). The verification ECU 5 holds the result of immobilizer verification establishment.

The restriction ECU 16 sends an inquiry to the verification ECU 5 to check the immobilizer verification result of the valet key 15 (S304). When obtaining a negative response from the verification ECU 5, the restriction ECU 16 notifies the user that the valet key 15 is not located in the vehicle, namely, the key cylinder 7 (S305). A screen indicating that the valet key 15 is not in located in the vehicle (key cylinder 7) is shown on the display 20. The user (person borrowing the valet key 15) recognizes the need to insert the valet key 15 into the key cylinder 7 due to the notification of S305.

Figure 11:
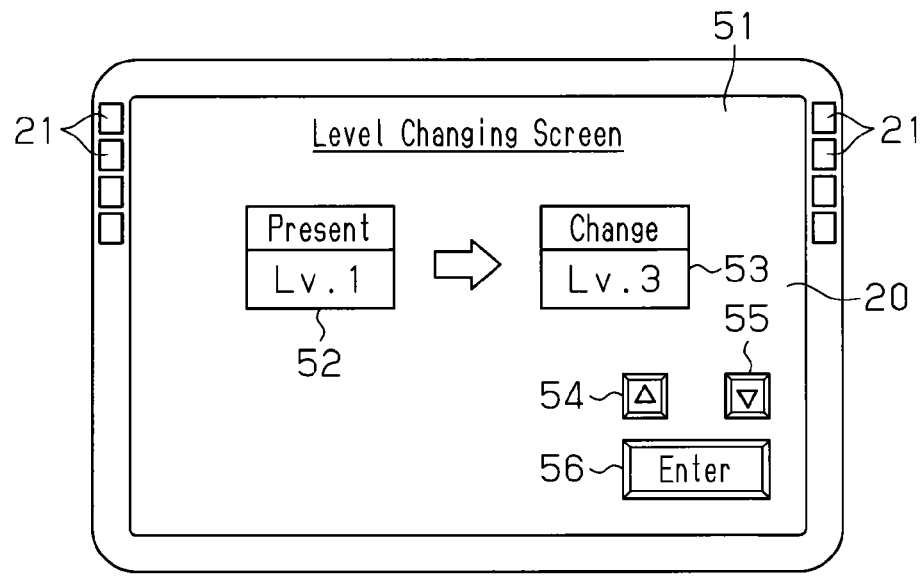
FIG. 11 is a screen shot of a restriction level varying screen.

The restriction ECU 16 displays a level changing screen 51 shown in FIG. 11 on the display 20 when obtaining an affirmative response from the verification ECU 5 in S304 (S306). The level changing screen 51 includes a set level display field 52 indicating the present valet key restriction level, a changing level input field 53, a numerical value increase button 54, a numerical value decrease button 55, and an enter button 56. The user inputs the desired valet key restriction level to the changing level input field 53. For example, the user touches the numerical value increase button 54 and the numerical value decrease button 55 to change the numerical value in the changing level input field 53 to the desired valet key restriction level. The user touches the enter button 56 after inputting the desired level.

Figure 14:
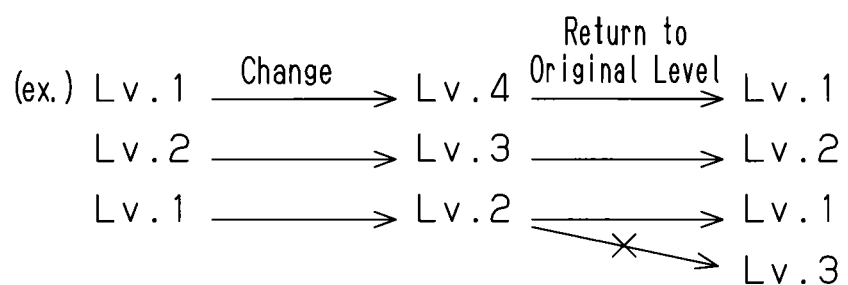
FIG. 14 is a table showing restriction levels that are variable after the valet key is lent to another person.

As shown in FIG. 14, the desired valet key restriction level is limited to levels that are higher than the level set when the valet key 15 was lent. This prevents the valet key restriction level from being changed to a lower level without authorization from an authorized user.

If the valet key restriction level was level 1 when the valet key 15 was first lent, the level can be changed to any one of levels 2 to 4. If the valet key restriction level was level 2 when the valet key 15 was first lent, the level can be changed to level 3 or 4. In the example of FIG. 14, if the valet key restriction level was level 3 when the valet key 15 was first lent, the level is not allowed to be changed. This is because it is difficult to assume that the person who the vehicle 1 is lent to will change from a mechanic in a repair shop to a valet for valet parking service. In another example, if the valet key restriction level was level 3 when the valet key 15 was first lent, the level may be changed to level 4.

Figure 12:
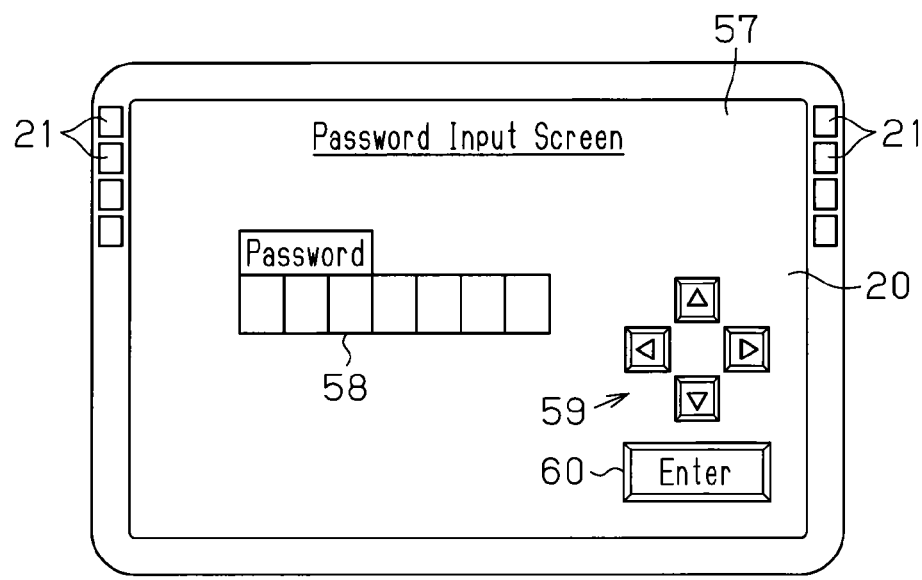
FIG. 12 is a screen shot of a password input screen.

When the operation of the enter button 56 is detected, the restriction ECU 16 displays a password input screen 57 shown in FIG. 12 on the display 20 (S307). The password input screen 57 includes a password input field 58, arrow keys 59, and an enter button 60. The user touches the arrow keys 59 to input a password in the password input field 58. The password may be, for example, number, alphabets, and marks.

The user touches the enter button 60 after inputting the password and ends the input of the password.

The restriction ECU 16 compares the input password with a password registered in advance in the restriction ECU 16 to perform password authentication (S308). The restriction ECU 16 provides a level change request Dcs to the verification ECU 5 when password authentication is established. The verification ECU 5 changes the valet key restriction level to a new level designated in accordance with the level change request Dcs (S309). Specifically, the verification ECU 5 changes the valet key restriction level of the valet key ID registered in the memory 13 to a new level.

If password authentication is not established, the restriction ECU 16 notifies the user that the password is erroneous (S310). For instance, the restriction ECU 16 activates the warning buzzer 41 to issue a warning or displays an error message on the display 20. The restriction ECU 16 then displays the password input screen 57 again on the display 20 to urge the user to re-input the password. If the password authentication continuously fails for a predetermined number of times, there is a high possibility that the password is not being input by the user or a person approved by the user. Thus, the restriction ECU 16 forcibly terminates the valet key restriction level changing mode.

The level return mode (FIG. 13) will now be discussed. The level return mode is selected when the user or the person borrowing the valet key 15 wishes to return the valet key restriction level to its original level, that is, the level before the change made in the valet key restriction level increase mode.

First, the user (or the person borrowing the valet key 15) carries the valet key 15 when entering the vehicle (S400). The user touches the display 20 to show the valet key restriction level setting screen 42 (FIG. 5) on the display 20 (S401). The user touches a level return mode button 61 of the valet key restriction level setting screen 42 to select the valet key restriction level return mode (S402).

The restriction ECU 16 then requests the user to insert the valet key 15 into the key cylinder 7 (S403). A message urging to insert the valet key 15 into the key cylinder 7 is displayed on the display 20. When the key detection switch 9 detects insertion of the valet key 15 into the key cylinder 7, the verification ECU 5 transmits the drive radio wave Skv from the immobilizer antenna 6 and executes immobilizer verification on the valet key 15 (in particular, the ID tag 34). The verification ECU 5 holds the immobilizer verification establishment result.

The restriction ECU 16 sends an inquiry to the verification ECU 5 to check the immobilizer verification result of the valet key 15 (S404). The restriction ECU 16 notifies the user that the valet key 15 is not in the vehicle (key cylinder 7) when obtaining a negative response from the verification ECU 5 (S405). For example, a message indicating that the valet key 15 is not in the vehicle (key cylinder 7) is displayed on the display 20. The user (or the person borrowing the valet key 15) recognizes the need to insert the valet key 15 into the key cylinder 7 due to the notification of S405.

The restriction ECU 16 displays the password input screen 57 shown in FIG. 12 on the display 20 when obtaining an affirmative response from the verification ECU 5 in S404 (S406). The user touches the arrow key 59 to input the password into the password input field 58 and then touches the enter button 60.

The restriction ECU 16 verifies the input password with the password registered in the restriction ECU 16 to perform password authentication (S407). When password authentication is established, the restriction ECU 16 provides the level return request Drs to the verification ECU 5.

The verification ECU 5 returns the valet key restriction level to the level when the valet key 15 was lent in accordance with the level return request Drs (S408). Specifically, the verification ECU 5 returns the valet key restriction level for the valet key ID registered in the memory 13 to the level when the valet key was lent.

If the password authentication is not established, the restriction ECU 16 notifies the user that the password is erroneous (S409). For instance, the restriction ECU 16 activates the warning buzzer 41 to issue a warning or displays an error message on the display 20. The restriction ECU 16 then displays the password input screen 57 again on the display 20 and urges the user to re-input the password.

If the password authentication continuously fails over a predetermined number of times, there is a high possibility that the password is not being input not by the user or a person approved by the user. Thus, the restriction ECU 16 forcibly terminates the valet key restriction level return mode.

When lending the vehicle 1 to another person, the valet key 15 must be dismounted from the key dock 32. In response to a dismounting request of the valet key 15, the display 20 shows the valet key restriction level selection screen 40. The versatility of the valet key system 14 is high since the user can set the restriction state (valet key restriction level) of the vehicle 1 at a level corresponding to the person to whom the vehicle 1 is lent. Since the valet key 15 is always retained in the vehicle 1 as long as it is not lent to someone, the user does not always need to carry such a key that is lent to another person. This simplifies matters and increases the convenience of the valet key system 14.

The present embodiment has the advantages described below.

(1) In the valet key system 14, the valet key 15, which is lent to a person to whom the vehicle 1 is lent, is mounted in the vehicle 1. The valet key system 14 operates in a plurality of modes for imposing restrictions on the functions of the vehicle 1. The user selects the restriction mode in accordance with the person to whom the vehicle 1 is lent. This increases the versatility of the valet key system 14.

Since the valet key 15 is mounted in the vehicle 1, the valet key 15 must be dismounted from the vehicle 1 in order to give the valet key 15 to the person to whom the vehicle 1 is lent. The valet key system 14 sets the restriction mode, which is selected by the user when dismounting the valet key 15 from the vehicle. This prevents the user from forgetting to set the restriction mode. Furthermore, the desired restriction mode is correctly set since the setting of the restriction mode is performed whenever the valet key 15 is dismounted from the vehicle.

(2) In one example, the user sets a desired valid period for the valet key 15 in the valet key system 14. In other words, the user sets any usable period for the vehicle 1 to which functional restrictions have been imposed. When the valid period of the valet key 15 expires, the functions of the vehicle 1 that were usable cannot be activated. The person borrowing the valet key 15 cannot permanently use the vehicle 1. This lowers the possibility that the vehicle 1, which implements the valet key system 14, will be stolen.

(3) In one example, the valet key ID, that is, the code string registered in the valet key 15, does not remain the same. That is, the key code registered in the valet key 15 is changed whenever a registration is performed, and the previous key code becomes invalid when a new key code is registered in the valet key 15. Thus, even if the wireless communication between the valet key 15 and the vehicle 1 is intercepted and the valet key ID is wrongfully acquired, key verification cannot be established with the previous valet key ID when the valet key 15 is lent again to someone. Further, the vehicle 1 cannot be operated with a wrongfully acquired valet key ID. This lowers the possibility of the vehicle 1 being stolen by a person who wrongfully acquires the key code.

(4) In one example, the restriction ECU 16, which is installed in the vehicle 1, registers the valet key ID in the valet key 15 and in the vehicle 1. The valet key 15 is thus registered in the vehicle 1 as a vehicle key to which functional restrictions are imposed. Thus, the control unit installed in the vehicle 1 serves as the subject that performs ID management such as registration and deletion of the valet key ID. The valet key 15 does not include the circuit for executing ID management such as registration and deletion of the valet key ID. Thus, the valet key 15 has a more simple structure, lighter weight, and reduced size.

(5) In one example, the valet key 15 must be dismounted from the valet key dock 32 to lend the vehicle 1 to another person in the restriction mode. Further, key verification of the master key 2 must be established to dismount the valet key 15 from the valet key dock 32. Therefore, in one example, the master key 2 must be processed to shift the vehicle 1 to the restriction mode. This prevents the vehicle 1 from being shifted to the restriction mode without the user knowing.

(6) In one example, the valet key 15 is accommodated in the glove box 27, and key verification of the master key 2 must be established to unlock the glove box 27. In one example, the master key 2 must be possessed to dismount the valet key 15 from the glove box 27. This prevents the glove box 27 from being wrongfully opened without the user knowing. Thus, it is difficult for the valet key 15 being freely dismounted from the vehicle 1.

(7) In one example, the valet key system 14 includes the valet key restriction level changing mode for changing the valet key restriction level from the level set when the valet key 15 is lent. Since the restriction mode of the vehicle 1 is changed as required after lending the valet key 15, the versatility of the valet key system 14 is improved.

(8) In one example, key verification is performed between the valet key 15 and the vehicle 1 when returning the valet key 15 to the valet key dock 32. The returning of the valet key 15 is permitted when key verification is established. Transmission of the drive radio wave Skv for key verification starts upon insertion of the valet key 15 into the valet key dock 32. Since the drive radio wave Skv does not need to be constantly transmitted, the power consumption required for radio wave transmission is reduced accordingly. This reduces the power consumed by the valet key system 14.

It should be apparent to those skilled in the art that the present invention may be embodied in many other specific forms without departing from the spirit or scope of the invention. Particularly, it should be understood that the present invention may be embodied in the following forms.

The restriction ECU 16 and the verification ECU 5 may be discrete units or may be a single ECU having the functions of the ECU 5 and 16.

If the valid period for the ID of the lent key expires, the restriction ECU 16 does not accept the valet key ID and prohibits vehicle operations performed with the valet key 15. However, the present invention is not limited in such a manner. For example, the valet key 15 may monitor the elapsed time from when the valet key ID is registered in the valet key 15, and the valet key 15 may stop transmission of the valet key ID when the valid period of the valet key ID expires to prohibit use of the vehicle 1. In other words, the management of the valid period may be performed by the control unit installed in the vehicle 1 or by the valet key 15.

The input device and the display device of the valet key system 14 does not have to be commonly shared with the car navigation system 19, and a dedicated input device and display device may be arranged in the valet key system 14.

The input device of the valet key system 14 is not limited to a touch panel type and may be a mechanical switch such as a push switch or a rotary switch.

The valet key 15 may be a magnetic card that can register the key code. The magnetic card has a magnetic recording portion, which records or reproduces various types of information using a magnetic field generated by an external device. In this case, the key dock 32 registers the key code to the valet key 15 through a contact type or a non-contact type magnetic card reader. Furthermore, the key code is provided from the valet key 15 to the verification ECU 5 using the contact type or non-contact type magnetic card reader instead of radio waves.

The key code in the valet key ID does not have to be changed whenever the valet key 15 is registered and may be changed in accordance with the person to whom the valet key 15 is lent or the restriction level. One valet key ID may be commonly assigned to a plurality of valet key restriction levels. In this case, the restriction ECU 16 holds information of the desired valet key restriction level.

The key code in the valet key ID does not have to be changed in accordance with the person to whom the valet key 15 is lent. A function code describing the contents of the key code in the valet key ID may be contained in the valet key ID, and a single valet key ID may be used differently in accordance with the function code.

The registration completion notification Sok, the ID registration signal Ssk, and the key ID signal Stb used in the RFID communication are signals in, for example, the LF band. However, the RFID communication protocol is not limited to signals in the LF band and signals in the RF band may be used.

The valet key restriction level changing mode may change the level set when lending the valet key 15 to a lower level.

The valet key restriction level changing mode may execute the key verification on the valet key 15 through the coil antenna 35 of the valet key dock 32 if the glove box 27 can be opened.

A function for changing the password, which is input when changing the valet key restriction level, may be added.

The warning of when key verification or password authentication is not established may be issued by a component other than the warning buzzer 41 that generates a sound such as a speaker of an in-vehicle audio device. Further, a warning message may be shown on the display 20. Alternatively, the above-described means may be combined.

In the valet key restriction level selection mode and the valet key restriction level changing mode, a limit time may be set for the input operation time. For example, each mode may be forcibly terminated when the input operation exceeds the limit time.

The input buttons shown in each of the screens 45, 51, and 57 are not limited to buttons and may be arrow keys.

The electronic key system is not limited to the immobilizer system 4 using the transponder 3 for transmitting the ID. For example, a key-free system (so-called smart key system) in which a power supply is built into the master key 2 may be employed. In this case, the control unit installed in the vehicle 1 constantly transmits a request, the master key 2 returns a key code to the vehicle 1 in response to the request signal, and the control unit performs key verification. The key-free system executes verification on the master key 2 outside and inside the vehicle 1. The locking and unlocking of vehicle doors are permitted or performed when the verification is established outside the vehicle 1, and the starting of the engine is permitted when verification is established inside the vehicle 1. The valet key system 14 determines that authentication of the master key 2 is established if one or both of the verifications are established.

The electronic key system is not limited to a code verification type for verifying a code string including a string of numbers, marks, and the like having a predetermined regularity. Instead, a biometric device for verifying biological information such as fingerprints may be employed.

The accommodation compartment is not limited to the glove box, and may be a console box, part of an instrument panel in front of the driver seat, and the like. The accommodation compartment is preferably unlocked when key verification of the master key 2 is established.

The present examples and embodiments are to be considered as illustrative and not restrictive, and the invention is not to be limited to the details given herein, but may be modified within the scope and equivalence of the appended claims.

What is claimed is:

1. A vehicle function restriction system comprising:
   a valet key mounted in a vehicle and configured to be dismountable from the vehicle and lent to a person to whom the vehicle is lent; and
   a restriction setting unit which sets the vehicle in a restriction state when the valet key is dismounted from the vehicle, wherein the restriction setting unit sets at least one restricted vehicle function which is not activated by the valet key, in accordance with the person to whom the vehicle is lent;
   wherein the valet key is an electronic key which transmits through wireless communication a key code registered in the valet key, establishment of key verification for the key code transmitted from the valet key enables activation of the valet key-activatable functions, and the restriction setting unit generates and registers the key code.

2. The vehicle function restriction system according to claim 1, further comprising:
   a valid period setting unit which sets a valid period for the valet key.

3. The vehicle function restriction system according to claim 1, wherein the restriction setting unit registers the key code in the valet key and a vehicle memory to set the vehicle in the restriction state; and the restriction setting unit changes the key code whenever the key code is registered.

4. The vehicle function restriction system according to claim 1, wherein the restriction setting unit is arranged in the vehicle.

5. The vehicle function restriction system according to claim 1, further comprising: a verification unit which executes key verification on a master key, which is allowed to activate any function of a vehicle, by verifying a key code stored in the master key with a key code registered in a vehicle memory; wherein the restriction setting unit sets the vehicle in the restriction state after key verification of the master key is established.

6. The vehicle function restriction system according to claim 1, further comprising:
   a verification unit which executes key verification on a master key by verifying a key code stored in the master key with a key code registered in a vehicle memory, wherein:
   when the valet key is mounted in the vehicle, the valet key is stored in a lockable accommodation compartment of the vehicle;
   when key verification of the master key is not established, the accommodation compartment is locked and the valet key is not able to be dismounted from the vehicle; and
   when key verification of the master key is established, the accommodation compartment is unlocked and the valet key becomes dismountable.

7. The vehicle function restriction system according to claim 1, further comprising: a restriction state changing unit which changes the restriction state of the vehicle, set when the valet key is lent to the person to whom the vehicle is lent, to another restriction state.

8. The vehicle function restriction system according to claim 1, further comprising:
   a key dock which receives the valet key, in which the restriction setting unit transmits the key code and registers the key code in the valet key when the valet key is received in the key dock.

9. The vehicle function restriction system according to claim 8, wherein the valet key includes a memory which stores the key code transmitted from the restriction setting unit.

10. The vehicle function restriction system according to claim 1, wherein the restriction setting unit registers a valet key ID in correspondence with the person to whom the vehicle is lent in both a memory of the valet key and a memory of the vehicle to set the vehicle in the restriction state.

11. The vehicle function restriction system according to claim 10, further comprising: a key dock which receives the valet key, in which the key dock ejects the valet key when key authentication of the master key is established and registration of the valet key ID in the memory of the valet key and the memory of the vehicle is completed.

12. A vehicle function restriction system comprising:
   a valet key including a memory;
   a key dock arranged in a lockable accommodation compartment of a vehicle; and
   a control unit coupled to the key dock, wherein the control unit is programmed to:
   unlock the accommodation compartment when key verification of a master key is established; generate a valet key ID in accordance with the person to whom the vehicle is lent; register the valet key ID in both the memory of the valet key and a memory of the vehicle in response to a request for dismounting the valet key from the key dock; and thereafter dismount the valet key from the key dock;
   wherein the valet key is an electronic key that transmits through wireless communication the valet key ID registered in the valet key, and the control unit is further programmed to enable activation of valet-key-activatable functions after verifying the valet key ID transmitted from the valet key.

13. A vehicle function restriction system comprising:
   a valet key mounted in a vehicle and configured to be dismountable from the vehicle and lent to a person to whom the vehicle is lent;
   a restriction setting unit which sets the vehicle in a restriction state when the valet key is dismounted from the vehicle, wherein the restriction setting unit sets at least one restricted vehicle function which is not activated by the valet key, and in accordance with the person to whom the vehicle is lent; and
   a verification unit which executes key verification on a master key by verifying a key code stored in the master key with a key code registered in a vehicle memory, wherein:

when the valet key is mounted in the vehicle, the valet key is stored in a lockable accommodation compartment of the vehicle;

when key verification of the master key is not established, the accommodation compartment is locked and the valet key is not able to be dismounted from the vehicle; and when key verification of the master key is established, the accommodation compartment is unlocked and the valet key becomes dismountable.

14. The vehicle function restriction system according to claim 13, further comprising:

a valid period setting unit which sets a valid period for the valet key.

15. The vehicle function restriction system according to claim 13, wherein: the valet key is an electronic key which transmits through wireless communication a valet key code registered in the valet key; establishment of key verification for the valet key code transmitted from the valet key enables activation of valet key-activatable functions other than the restricted vehicle functions; the restriction setting unit registers the vale key code in the valet key and a vehicle memory to set the vehicle in the restriction state; and the restriction setting unit changes the valet key code whenever the valet key code is registered.

* * * * *